(12) United States Patent  
Heine

(10) Patent No.: US 6,552,354 B2  
(45) Date of Patent: Apr. 22, 2003

(54) PHOTO DEVICE FOR MONITORING SETTING WIDTH OF SAW TEETH

(75) Inventor: Werner Heine, Wiggensbach (DE)

(73) Assignee: FA. Georg Kesel gmbH & Co. KG, Kempten (DE)

( * ) Notice: Subject to any disclaimer, the term of this patent is extended or adjusted under 35 U.S.C. 154(b) by 67 days.

(21) Appl. No.: 09/725,697

(22) Filed: Nov. 29, 2000

(65) Prior Publication Data

US 2001/0003355 A1 Jun. 14, 2001

(30) Foreign Application Priority Data

Dec. 10, 1999 (DE) .......................................... 199 59 471

(51) Int. Cl.[7] .............................................. G01N 21/86
(52) U.S. Cl. ...................... 250/559.06; 76/112; 83/368; 83/820
(58) Field of Search ........................... 250/221, 559.06; 83/365, 368, 370, 72, 76.7, 820, 841; 76/112

(56) References Cited

U.S. PATENT DOCUMENTS 5,176,055 A * 1/1993 Wijesinghe et al. ............ 83/72  
6,272,964 B1 * 8/2001 Heilshov ....................... 83/821  
6,378,408 B2 * 4/2002 Smith .......................... 700/193

* cited by examiner

Primary Examiner—Stephone Allen  
Assistant Examiner—Bradford Hill  
(74) Attorney, Agent, or Firm—Notaro & Michalos P.C.

(57) ABSTRACT

In order to obtain a simple, inexpensive and low-maintenance monitoring device for controlling the setting width of individual teeth of saw blades or belt-saw blades, in particular for controlling the setting result of a setting machine the present invention invisages that the monitoring device comprises at least one photo-detector whose light beam at least partly runs through one or both regions laterally next to the running-past saw blade or belt-saw blade, into said regions the set teeth project.

18 Claims, 2 Drawing Sheets

PHOTO DEVICE FOR MONITORING SETTING WIDTH OF SAW TEETH

FIELD AND BACKGROUND OF THE INVENTION

The invention relates to a device for monitoring and controlling the setting width of individual teeth of saw blades or belt-saw blades, and in particular for controlling the width of the setting made by a setting machine.

German Patent DE 195 17 482 A1 teaches determination of the deviation between an actual setting and a nominal setting via monitoring which does not make physical contact (e.g., opto-electronically).

Typically, opto-electronic monitoring is achieved by line cameras which monitor and record the actual width. If there is a deviation between the actual setting width and a nominal setting width, an automatic correction of the setting machine is made. These cameras are disadvantageous because they are expensive and sensitive to contamination. The cameras must precisely and accurately focus on the region where the actual width is found. Therefore, a considerable maintenance expense arises from adjusting and monitoring of the focus and from the regular cleaning of the camera. Otherwise unusable results are obtained.

SUMMARY OF THE INVENTION

It is an object of the invention to provide a device for monitoring and controlling the setting width of individual teeth of saw blades or belt-saw blades, which operates reliably with the least amount of maintenance and manufacturing costs.

The object of the invention is achieved in that the monitoring device comprises at least one photo sensor which emits a light beam at least partly through a monitored region, adjacent to the running saw blade or belt-saw blade, where the set teeth 2 project laterally. Photo sensors are inexpensive to obtain and adjust, as compared to line cameras. A narrow parallel light beam between the light emitter and a light receiver allows the monitored region to be monitored with precise and accurate focus. Because the present invention does not use a lens like line cameras do, there is less chance of contamination, and the maintenance expense that is associated with line cameras is therefore reduced.

Although generally one photo sensor would be sufficient to monitor both sides of the saw blade, by for example using a mirror, a preferred embodiment of the invention includes two photo sensors for monitoring adjacent monitored regions on both sides of the saw blade or belt-saw blade.

The photo sensor may also comprise a laser, which obtains a sharply limited parallel light beam that is well suited for the monitoring of the setting made.

In a further embodiment of the invention, the photo sensor may be designed as a laser scanner, i.e. a light emitter and light receiver are rigidly connected by way of a U-shaped bow.

Such a laser scanner may be assembled on a laterally traversable and fixable carriage in order to be able to simply and safely emit the light beam precisely onto the region to be monitored.

The light beam is preferably emitted at a small angle with respect to the plane of the saw blade or belt-saw blade because an arrangement where the light beam is emitted parallel to the plane of a blade is subject to false or erroneous measurement if there is a backing of the saw or lateral deflection of the saw. If the backing of the saw is caused by a problem with the advancement of the saw, and is laterally deflected, the saw may not be within the region of the light beam. There is however no significant difference with respect to optical conditions between a light beam emitted at a small angle with respect to the plane of the blade and a light beam emitted parallel to the plane of the blade.

In another embodiment of the invention, the cross section of the light beam effective for the monitoring is dimensioned and arranged in a manner such that it essentially encompasses half the belt-saw blade body and the maximum setting width. The region between the middle position of the set tooth and the belt-saw blade body may be monitored, and even corrected if necessary, by way of the light beam that overlaps the belt-saw blade.

Centering is required for a reliable determination of the setting width. In order to ensure centering, a centering device is provided which centers the advancing belt-saw blade with respect to the photo sensors.

The centering device comprises two laterally adjacent jaws which are movably guided perpendicular to the saw blade plane and which are elastically pressed onto the belt-saw blade body in order to guide the belt-saw blade. A mechanical synchronization of a movement of the two jaws in opposite directions is further provided. In this manner the elastically mounted jaws may continuously laterally yield should the thickness of the belt-saw blade change or other lateral forces occur by way of disorder, such as for example by the waviness of the belt-saw blade. It is however always guaranteed that the jaws in each case are displaced by the same path distance, one to the right and the other to the left, so that a thicker belt-saw blade is always led symmetrically to a middle plane lying between the jaws. The jaws in each case are connected to a rack, and the teeth of the rack are in engagement with opposite sides of a pinion.

DESCRIPTION OF THE PREFERRED EMBODIMENTS

Figure 1:
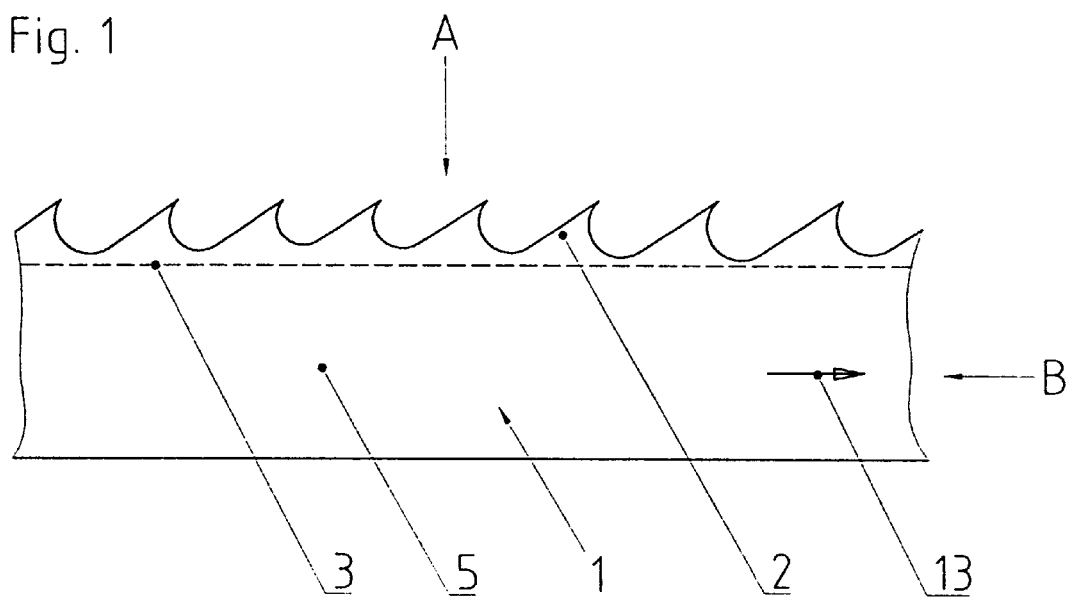
FIG. 1 is a side view of a part of a saw blade.
Figure 2:
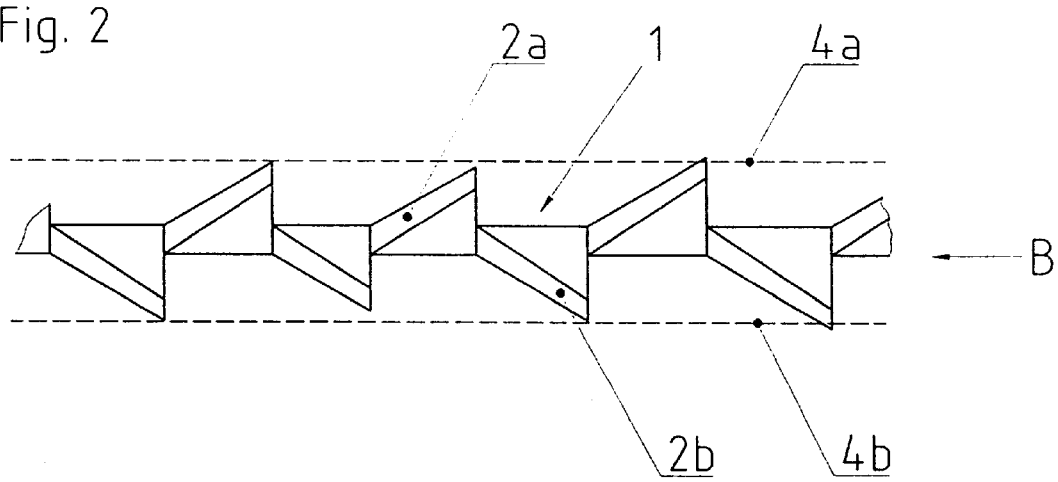
FIG. 2 is a top plan view of FIG. 1 of the same saw blade.

FIG. 1 shows a belt-saw blade 1 which is provided for use in belt-saw blade saws. The belt-saw blade 1 has teeth 2 which are arranged on a belt-saw blade body 5. Teeth 2 and blade body 5 are designed as one piece. The setting of bi-metal belt-saw blades is also possible. Along a line 3, the teeth 2, as also shown in FIG. 2, are laterally bent out of the plane of the belt-saw blade body 5 to the front and to the rear, so that there arises two groups of teeth, specifically a tooth group 2a which is bent to one side of the belt-saw blade 1, and a tooth group 2b which is bent to the other side of the belt-saw blade 1. The tooth groups 2a and 2b define a setting width indicated by way of the lines 4a and 4b.

The setting is normally carried out in an automatic setting machine, wherein the actual setting width may deviate from the nominal setting width. Since the proper functioning of the belt-saw blade is dependent on the setting width, the setting result must be monitored and any deviations from the nominal value must be automatically corrected. In this invention an alarm may be triggered to indicate a deviation.

Figure 3:
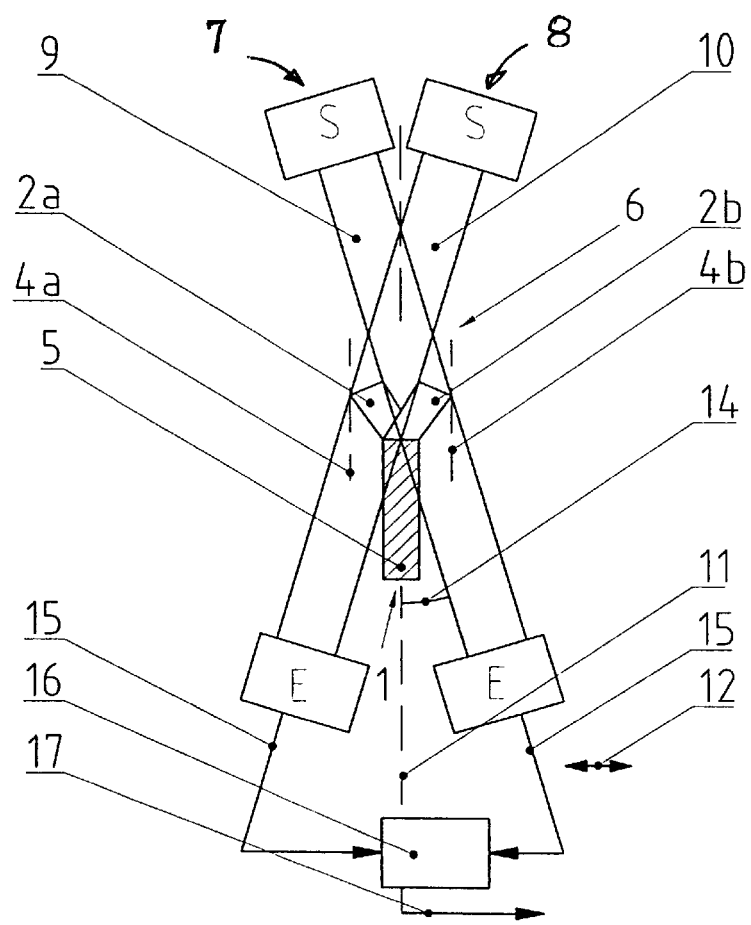
FIG. 3 is a schematic representation of a monitoring device according to the invention.

A monitoring device 6, schematically represented in FIG. 3, is provided for monitoring the resulting width from the setting of the teeth. The monitoring device 6 comprises two photo sensors 7, 8 which in each case have a light emitter S and a light receiver E arranged opposite the light emitter S. The light emitter S consists of two lasers from which laser beams 9, 10 proceed which meet in the respectively allocated light receiver E. In the middle of FIG. 3, a belt-saw blade 1 is provided in a direction B as indicated in FIGS. 1 and 2. The belt-saw blade body 5 is centered with respect to a middle plane by way of a centering device described further below, wherein the teeth 2a and 2b project laterally to the left and right respectively.

The two laser beams 9, 10 are arranged in a manner such that they irradiate the two adjacent regions on the right and left sides of the belt-saw blade 1 into which the set teeth 2a and 2b laterally project. Laser beam 9 is provided for monitoring the teeth projecting out to the right and laser beam 10 for monitoring the teeth 2a projecting out to the left. Preferably the photo sensors, having a light emitter S and a light receiver E, are designed as laser scanners wherein the laser serves as a light emitter on the one side and a light receiver on the other side and the emitter and receiver are connected to one another by a U-shaped bow and thus are adjusted and fixed in their relative position to one another.

The laser scanners are preferably in turn mounted on a carriage which is not shown, so that each photo sensor is displaceable as a unit in the arrow direction 12 and after adjusting the respective laser beam 9, 10 are fixable onto the region to be monitored.

The belt-saw blade 1 for checking the setting result is transported in the advance direction 13 (see FIG. 1) through the monitoring device. In order to avoid errors in measuring, resulting from lateral movements of the belt-saw blade body 5 into the region of a laser beam 9, 10 the laser beams are not arranged parallel to the belt-saw blade body 5 and middle plane 11, but at a small angle 14 with respect to the middle plane 11. Furthermore the cross sections of the laser beams 9, 10 are dimensioned such that apart from overlapping the maximum setting width 4a, 4b they also approximately overlap half the thickness of the belt-saw blade body 5. Therefore, the relative position of the belt-saw blade body 5 to the middle plane may be optically recorded and evaluated, since at the moment when the respective laser beam 9 emits through the gap between two teeth 2a and 2b it is still only partly shadowed by the section of the belt-saw blade body which projects into the region of the laser beam 9 and 10.

Signals are emitted from the light receivers and are led to electronic evaluation devices via measuring conduits 15. Electronic evaluation devices preferably consist of a programmable microprocessor. When there are deviations of the actual setting width from the predetermined nominal setting width, a signal can be emitted via a signal conduit 17. Either an alarm may be triggered or a correction may be made in the setting machine automatically. The same applies for a deviation of the belt-saw blade body 5 from the middle position defined by the middle plane 11.

Figure 4:
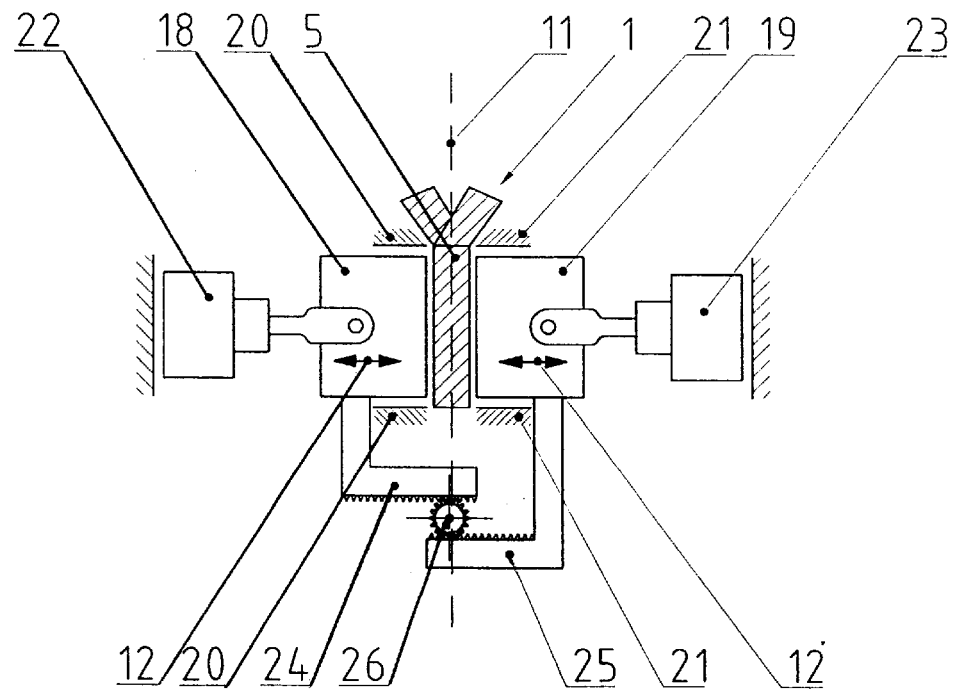
FIG. 4 is a schematic representation of a centering device.

In order to hold the belt-saw blade body 5 centered, a centering device is provided, as shown in FIG. 4. This centering device consists of two centering jaws 18, 19 which each have associated parallel guides 20, 21, that are movably guided perpendicular to the saw blade plane or to the middle plane 11 in the arrow direction 12, and are elastically pressed onto the belt-saw blade body 5 of the belt-saw blade via two pneumatic pressing devices 22, 23 in order to guide the belt-saw blade 1. In order to ensure that the belt-saw blade 1 is always guided symmetrically to the middle plane 11 the movement of the two centering jaws 18, 19 in the arrow direction 12 is synchronized in opposite directions. The two centering jaws 18, 19 are connected to a rack 24, 25, wherein the respective teeth of the racks bear on opposite sides of a pinion 26 and are in engagement with the teeth of the pinion. When centering jaw 18 is moved the other centering jaw 19 is forced into an opposite movement so that the belt-saw blade 1 is always guided symmetrically to the middle plane, even with changes of the belt-saw blade thickness.

What is claimed is:

1. A monitoring device for controlling a setting width of individual teeth of longitudinally moving saw blades or belt-saw blades, comprising:

at least one photo sensor positioned at an angle with respect to a center plane of the moving saw blade or belt-saw blade, having a light emitter and a light receiver that are directly opposite each other;

wherein said light emitter emits a light beam at least partly through a monitored region, that is laterally adjacent to the moving saw blade or belt-saw blade, where a set tooth projects laterally from said saw blade or belt-saw blade; and said light receiver detects said light beam after it passes said monitored region.

2. A device according to claim 1, wherein the photo sensor comprises a laser.

3. A device according to claim 2, wherein the photo sensor is formed as a laser scanner.

4. A device according to claim 3, wherein the laser scanner is mounted on a laterally traversable and fixable carriage.

5. A device according to claim 4, wherein the photo sensor is positioned at a small angle with respect to a center plane of the moving saw blade or belt-saw blade.

6. A device according to claim 5, wherein the light beam from said photo sensor is dimensioned and arranged such that it covers half the saw blade or belt-saw blade body and a maximum setting width of individual teeth.

7. A device according to claim 6, further comprising a centering device for centering the moving saw blade or belt-saw blade with respect to the photo sensor.

8. A device according to claim 7, wherein the centering device comprises centering jaws which are movably guided perpendicular to the center plane, and which are elastically pressable onto said saw blade or belt-saw blade.

9. A device according to claim 8, wherein said jaws are mechanically synchronized by connection to a rack, wherein toothing of the racks are in engagement with opposite sides of a pinion such that movement of one centering jaw results in an opposite movement by the other centering jaw, so that the saw blade or belt saw blade is guided symmetrically with respect to the center plane.

10. A device according to claim 1, wherein two photo sensors are provided emitting two separate light beams;

a first photo sensor with a first light emitter on a left side of the center plane and a first light receiver opposite said first light emitter on a right side of said center plane; and a second photo sensor with a second light emitter on a right side of the center plane and a second light receiver opposite said second light emitter on a left side of said center plane.

11. A device according to claim 10, wherein the photo sensors comprise a laser.

12. A device according to claim 11, wherein the photo sensors are formed as laser scanners.

13. A device according to claim 12, wherein the laser scanners are mounted on a laterally traversable and fixable carriage.

14. A device according to claim 13, wherein the photo sensors are positioned at a small angle with respect to a center plane of the moving saw blade or belt-saw blade.

15. A device according to claim 14, wherein the light beams from said photo sensors are dimensioned and arranged such that they cover half the saw blade or belt-saw blade body and a maximum setting width of individual teeth.

16. A device according to claim 15, further comprising a centering device for centering the moving saw blade or belt-saw blade with respect to the photo sensors.

17. A device according to claim 16, wherein the centering device comprises centering jaws which are movably guided perpendicular to the center plane, and which are elastically pressable onto said saw blade or belt-saw blade.

18. A device according to claim 17, wherein said jaws are mechanically synchronized by connection to a rack, wherein toothing of the racks are in engagement with opposite sides of a pinion such that movement of one centering jaw results in an opposite movement by the other centering jaw, so that the saw blade or belt saw blade is guided symmetrically with respect to the center plane.

* * * * *